US008218448B1

(12) United States Patent
Cox, Jr. et al.

(10) Patent No.: US 8,218,448 B1
(45) Date of Patent: Jul. 10, 2012

(54) CONTROL NETWORKS PROVIDING RELIABLE COMMUNICATIONS BETWEEN DIFFERENT ENTITIES

(75) Inventors: Jerome R. Cox, Jr., St. Louis, MO (US); Michael B. Grote, St. Louis, MO (US)

(73) Assignee: Blended Integrated Circuit Systems, LLC, St. Louis, MO (US)

(*) Notice: Subject to any disclaimer, the term of this patent is extended or adjusted under 35 U.S.C. 154(b) by 0 days.

(21) Appl. No.: 12/869,298

(22) Filed: Aug. 26, 2010

(51) Int. Cl.
H04L 12/26 (2006.01)
(52) U.S. Cl. ........................................ 370/242; 717/126
(58) Field of Classification Search .................. None
See application file for complete search history.

(56) References Cited

U.S. PATENT DOCUMENTS

| | | | |
|---|---|---|---|
| 6,671,874 B1* | 12/2003 | Passova ........................ | 717/126 |
| 6,876,894 B1* | 4/2005 | Chen et al. .................... | 700/100 |
| 7,634,749 B1 | 12/2009 | Cortadella et al. | |
| 7,657,862 B2 | 2/2010 | Kishinevsky et al. | |
| 7,701,255 B2 | 4/2010 | Cortadella et al. | |
| 7,870,516 B2 | 1/2011 | Sotiriou et al. | |
| 2008/0136445 A1 | 6/2008 | Kishinevsky et al. | |
| 2009/0089741 A1* | 4/2009 | Bornhoevd et al. ........... | 717/106 |
| 2009/0115469 A1 | 5/2009 | Cortadella et al. | |
| 2009/0115488 A1 | 5/2009 | Cortadella et al. | |
| 2009/0115503 A1 | 5/2009 | Cortadella et al. | |
| 2009/0116597 A1 | 5/2009 | Cortadella et al. | |
| 2009/0119621 A1 | 5/2009 | Cortadella et al. | |
| 2009/0119622 A1 | 5/2009 | Cortadella et al. | |
| 2009/0119631 A1 | 5/2009 | Cortadella et al. | |
| 2009/0183126 A1 | 7/2009 | Sotiriou et al. | |
| 2009/0271131 A1* | 10/2009 | Ashton ........................... | 702/57 |

OTHER PUBLICATIONS

John Bainbridge, The CHAIN Works Tool Suite: A Complete Industrial Design Flow for Networks-on-Chips, Network-On-Chips Theory and Practice, 2009, Chapter 10, pp. 281-306, CRC Press, Boca Raton, FL.
Krstic et al, Specification of Optimized GALS Interfaces and Application Scenarios, EU Project GALAXY, Dec. 24, 2008 (60 pages).
White Paper, Elastix Corporation, (2008), http://www.elastix-corp.com/whitepaper.html (6 pages).
J. Cortadella, Asynchronous circuit verification and synthesis with Petri nets. Workshop on Hardware Design and Petri Nets (HWPN'98), Lisbon, Jun. 23, 1998 (69 pages).
Overview of Macromodules, Macromodular Computer Design, Part 1, Development of Macromodules, (Feb. 1974), vol. 1, Technical Report No. 44, Computer Systems Laboratory, Washington University, St. Louis, MO (144 pages).

* cited by examiner

*Primary Examiner* — Min Jung
(74) *Attorney, Agent, or Firm* — The Law Office of Kirk D. Williams

(57) ABSTRACT

The integrity of a control network for providing reliable communications between different entities is verified. Such a verified control network may be included in a device, system, or design library. The verification of a control network includes, but is not limited to: physically exercising the control network itself and/or its design via modeling, analysis, and/or applying or using other testing or design verification methodologies. For example, a Petri net model of the control network may be analyzed to verify that the control signals cannot be generated which could interfere with each other, that a deadlock condition cannot be reached, and that a control signal on an input port will result in a control signal on an output port, albeit possibly delayed.

32 Claims, 6 Drawing Sheets

US 8,218,448 B1

CONTROL NETWORKS PROVIDING RELIABLE COMMUNICATIONS BETWEEN DIFFERENT ENTITIES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of STTR Phase I Grant 0741055 and STTR Phase II Grant 0924010 awarded by National Science Foundation.

TECHNICAL FIELD

The present disclosure relates generally to the design of computer and communication systems; and in particular, but not limited to, control networks that generate control signals providing for reliable communications among different entities, such as differently clocked subsystems.

BACKGROUND

The semiconductor industry continues to decrease the minimum feature-size of transistors and thereby increase the density of transistors on an integrated circuit (IC). Today, billion-transistor circuits are being produced and much higher densities are forecast for the years to come. However, it has become increasingly difficult to meet timing constraints throughout an IC that has but a single clock domain. A globally-asynchronous, locally-synchronous (GALS) approach has been gaining in popularity to overcome this difficult architectural problem. The GALS approach is to partition a system design into decoupled clock-independent modules which can be designed to meet their individual requirements. These independent modules can then be coupled using an asynchronous interconnect network or an asynchronous network-on-chip (ANoC), which improves reliability by simplifying clock-domain crossing timing by using delay-insensitive connection modules. However, the complexity of such interconnect networks (measured in terms of the number of different ways control signals traverse such an interconnect network) grows exponentially instead of linearly as the number of independent control network elements used in implementing the interconnect network is increased. Therefore, the ability to provide a reliable interconnect network becomes problematic.

BRIEF DESCRIPTION OF THE DRAWINGS

The invention, together with its advantages, may be best understood from the following detailed description taken in conjunction with the accompanying drawings of which.

DESCRIPTION OF EXAMPLE EMBODIMENTS

1. Overview

Figure 1A:
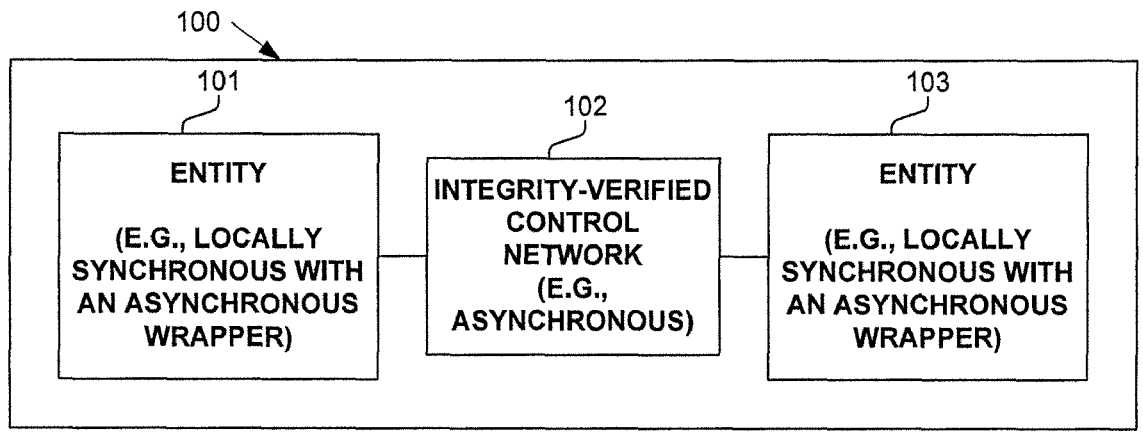
FIG. 1A illustrates a system operating according to one embodiment.

Disclosed are, inter alia, methods, systems, appliances, apparatus, computer-storage media, devices, chips, components, library-circuit designs and macros, and means associated with verifying the integrity of a control network for providing reliable communications between different entities, and/or including a verified control network in a system, device or design library. A control network includes one or more control network elements. The verification of a control network includes, but is not limited to: physically exercising the control network itself and/or its design via modeling, analysis, and/or applying or using other testing or design verification methodologies.

In one embodiment, the integrity of a control network is, or has been, verified by operations including: (a) determining that each input of one or more inputs of the control network can individually, without a control signal from another of the plurality of inputs, generate a control signal on at least one output of one or more outputs of the control network; (b) determining that the control network will always operate in a manner to lead to a state which is ready to accept a control signal on any of its inputs; and (c) determining that the control network will always operate in a manner that a plurality of particular control signals cannot be generated which could interfere with each other to cause a degradation of at least one of the plurality of particular control signals.

In other words, one embodiment uses the term "integrity" in regards to a control network to refer to a control network that has been verified that: (a) a control signal on an input port will result in a control signal on an output port without requiring a control signal on another input port; (b) a sequence of control signals will not result in a deadlock condition; and (c) control signals will not interfere with one another causing a degradation of at least one signal. To verify the integrity of a control network, the network itself can be exercised. However, control networks of a certain size or greater have so many control signal states, that the verification of a control network typically includes modeling of the control network and analyzing this model. Such analysis of the model has the further advantage of testing the control network without incurring the costs of its implementation (e.g., fabrication). Graph theory, and in particular Petri nets, are examples of technology that can be used to model a control network.

2. Description

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, field-programmable gate array (FPGA), application-specific integrated circuit (ASIC), methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device. The term "packet" refers to a data packet or frame, such as, but not limited to, an Internet Protocol (IP) packet or Ethernet frame; and the format of a packet includes at least a packet header and payload.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, systems, appliances, apparatus, computer-storage media, devices, chips, components, library-circuit designs and macros, and means associated with verifying the integrity of a control network for providing reliable communications between different entities, and/or including a verified control network in a system, device or design library. A control network includes one or more control network elements. Also, a control network subject to verification of its integrity may be a portion (e.g., a subset) of a larger control network, as the larger control network may have some other functions or simply it may be decided to only verify the integrity of the portion of the larger control network. The verification of a control network includes, but is not limited to: physically exercising the control network itself and/or its design via modeling, analysis, and/or applying or using other testing or design verification methodologies.

One embodiment restricts a general model of asynchronous systems (e.g., Petri nets or trace theory) to a much less general model. This restricted model describes a set of control networks that has the important property of ensuring that all parallel and series compositions of these control networks are also in the set. Thus, if all the control networks (e.g., each including one or more control elements) have desirable properties such as the absence of deadlock (liveness), control event conservation (safety) and the absence of process interference (port independence), then the proper composition of such control networks will also have these desirable properties. Note, a set of live and safe Petri nets could be created that do not have the port independence property, but compositions of these Petri nets would not necessarily be live and safe. Adding the port-independence restriction ensures the desirable properties (liveness, safety, port independence) present in the individual control networks are also present in all parallel or series composition of these individual control networks. A composition of live and safe control networks that do not each also have the property of being port independent could describe a system that can deadlock, is unsafe or has interfering processes. Thus, the integrity of a control network may be accomplished by verifying the presence of liveness, safety, and port independence of either (1) the entire control network, itself; or (2) each individual subset control network of the control network, with these subset control networks connected appropriately to create a composition of these control networks, with that composition being the entire control network.

In one embodiment, the integrity of a control network is, or has been, verified by operations including: (a) determining that each input of one or more inputs of the control network can individually, without a control signal from another of the plurality of inputs, generate a control signal on at least one output of one or more outputs of the control network; (b) determining that the control network will always operate in a manner to lead to a state which is ready to accept a control signal on any of its inputs; and (c) determining that the control network will always operate in a manner that a plurality of particular control signals cannot be generated which could interfere with each other to cause a degradation of at least one of the plurality of particular control signals.

In other words, one embodiment uses the term "integrity" in regards to a control network to refer to a control network that has been verified that: (a) a control signal on an input port will result in a control signal on an output port without requiring a control signal on another input port; (b) a sequence of control signals will not result in a deadlock condition; and (c) control signals will not interfere with one another causing a degradation of at least one signal. To verify the integrity of a control network, the network itself can be exercised. However, control networks of a certain size or greater have so many control signal states, that the verification of a control network typically includes modeling of the control network and analyzing this model. Such analysis of the model has the further advantage of testing the control network without incurring the costs of its implementation (e.g., fabrication). Graph theory, and in particular Petri nets, are examples of technology that can be used to model a control network.

In one embodiment, only a single control network element is in the control network. In one embodiment, a control network includes multiple control network elements. One embodiment represents the control network as a control network model; wherein each of said operations of (a), (b), and (c) include exercising of the control network model. In one embodiment, the control network model uses trace theory.

In one embodiment, the control network model includes a Petri net. In one embodiment, each of said one or more inputs and said one or more outputs of the control network is represented as a transition.

In one embodiment, the verification of the control network is performed using a Petri net, such that one or more of the verification operations of the method includes for each particular input of said one or more inputs: determining, for a subset of the Petri net which does not include any transitions whose enablement depends on the firing of a transition corresponding to any other of said one or more inputs, that there is a transition firing sequence, initiated by the firing of a transition corresponding to said particular input, through the subset of the Petri net leading to an eventual enablement of a transition corresponding to an output of said one or more outputs. In one embodiment, said operation of determining that there is a transition firing sequence is repeated for each possible marking of the Petri net, eventually generated from an initial marking of the Petri net, in which the transition corresponding to said particular input is enabled; wherein the initial marking of the Petri net corresponds to an initial state of the control network.

In one embodiment, the verification of the control network is performed using a Petri net, such that one or more of the verification operations of the method includes confirming that each transition in the Petri net is eventually enabled from the initial marking of the Petri net. In one embodiment, the verification of the control network is performed using a Petri net, such that one or more of the verification operations of the method includes: verifying that for each particular transition in the Petri net: there is a firing sequence therefrom leading to the initial marking.

In one embodiment, the verification of the control network is performed using a Petri net, such that one or more of the verification operations of the method includes: determining that from an initial marking, no sequence of firings in the Petri net will result in more than a predetermined allowed number of tokens at a same place in the Petri net. In one embodiment, the predetermined allowed number of tokens at all places is one. In one embodiment, at least two different places in the Petri net have different said predetermined allowed number of tokens. In one embodiment, the verification of the control network is performed using a Petri net, such that one or more of the verification operations of the method includes: determining that from the initial marking, all transitions will be fired by a set of one or more firing sequences in the Petri net.

One embodiment includes an apparatus for verifying the integrity of a control network, with the apparatus comprising: means for determining that each input of one or more inputs of a control network can individually, without a control signal from another of the plurality of inputs, generate a control signal on at least one output of one or more outputs of the control network; means for determining that the control network will always operate in a manner to lead to a state which is ready to accept a control signal on any of its inputs; and means for determining that the control network will always operate in a manner that a plurality of particular control signals cannot be generated which could interfere with each other to cause a degradation of at least one of the plurality of particular control signals. In one embodiment, each of said means for determining exercise a Petri net representation of the control network.

One embodiment includes an apparatus for verifying the integrity of a control network, with the apparatus comprising: one or more processing elements; and memory. These one or more processing elements are configured to perform operations, including: (a) determining that each input of one or more inputs of the control network can individually, without a control signal from another of the plurality of inputs, generate a control signal on at least one output of one or more outputs of the control network; (b) determining that the control network will always operate in a manner to lead to a state which is ready to accept a control signal on any of its inputs; and (c) determining that the control network will always operate in a manner that a plurality of particular control signals cannot be generated which could interfere with each other to cause a degradation of at least one of the plurality of particular control signals. In one embodiment, said operations include: representing the control network as a control network model; wherein each of said operations of (a), (b), and (c) include exercising of the control network model.

One embodiment includes an apparatus, comprising: one or more processing elements; and one or more storage devices; wherein said one or more processing elements are configured to implement circuit designing or layout of systems, which includes interfacing two or more subsystems using a control network; and wherein the control network has been verified that: each input of one or more inputs of the control network can individually, without a control signal from another of the plurality of inputs, generate a control signal on at least one output of one or more outputs of the control network; the control network will always operate in a manner to lead to a state which is ready to accept a control signal on any of its inputs; and the control network will always operate in a manner that two particular control signals cannot be generated which could interfere with each other to cause a degradation of at least one of the plurality of particular control signals. In one embodiment, a Petri net model of the control network will include at least one hundred transitions.

One embodiment includes an apparatus, comprising: a plurality of entities; and a control network for providing control signals for interfacing between two entities a plurality of circuits in order to provide a reliable interface between the plurality of circuits; wherein the control network has been verified that: each input of one or more inputs of the control network can individually, without a control signal from another of the plurality of inputs, generate a control signal on at least one output of one or more outputs of the control network; the control network will always operate in a manner to lead to a state which is ready to accept a control signal on any of its inputs; and the control network will always operate in a manner that two particular control signals cannot be generated which could interfere with each other to cause a degradation of at least one of the plurality of particular control signals. In one embodiment, a Petri net model of the control network will include at least one hundred transitions, or even thousands or millions of transitions. In one embodiment, each of the plurality of entities is a locally-synchronous object.

In such a manner, the integrity of a control network for providing reliable communications between different entities is verified. Such a verified control network may be included in a device, system, or design library. The verification of a control network includes, but is not limited to: physically exercising the control network itself and/or its design via modeling, analysis, and/or applying or using other testing or design verification methodologies. For example, a Petri net model of the control network may be analyzed to verify that the control signals cannot be generated which could interfere with each other, that a deadlock condition cannot be reached, and that a control signal on an input port will result in a control signal on an output port, albeit possibly delayed.

Expressly turning to the figures, FIG. 1A illustrates a globally asynchronous, locally-synchronous (GALS) system 100 including a control network 102, whose integrity has been verified. Control network 102 includes one or more control network elements. As shown, control network 102 is used to communicate data between entities 101 and 103. Examples of the communication process of one embodiment are further described herein, including in relation to FIGS. 1B and 2A-C.

In general, it is the responsibility of the control network to deliver reliably, and at any time, data from any entity to another entity. Because unpredictable delays may occur within the control network, correct operation requires control circuitry insensitive to these delays. The transmission of data should occur reliably, independent of which network input and output ports are used. All such ports should always be live and the entire network should operate safely, i.e., without loss of control events.

A control network in a GALS system is typically implemented using asynchronous technology, and used to interconnect synchronous entities. However, one embodiment does not follow this mold, as the entities may be synchronous or asynchronous, and a control network may use some synchronous technology. In one embodiment that connects a synchronous system to an asynchronous control network, an asynchronous "wrapper"/interface is attached to the synchronous system to allow reliable communications. Additionally, in one embodiment, the control logic and signals of a control network are asynchronous, but the actual transference of data between a control network element and entity uses synchronous technology (e.g., the data path is synchronous, while the control path is asynchronous). Moreover, the "data" transferred in response to a control event may be one or more bits, bytes, words, packets, or some other grouping of information. The control events trigger the timing of the transference of data.

Figure 1B:
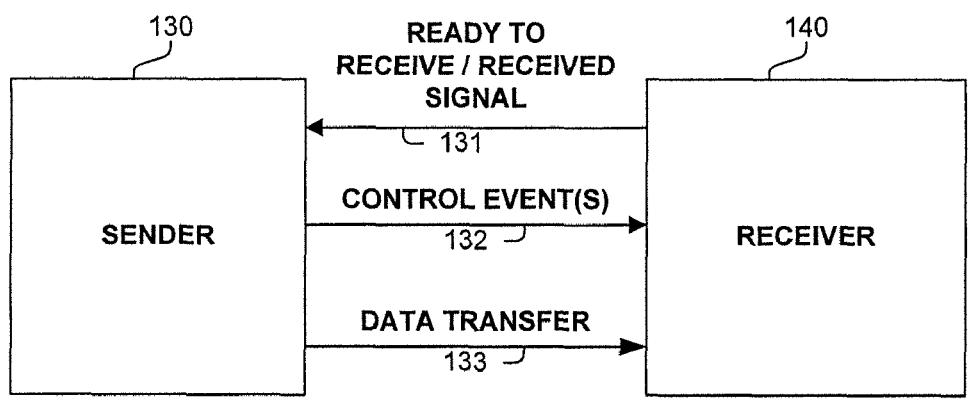
FIG. 1B illustrates communication performed in one embodiment.

Returning to the description of the figures, FIG. 1B illustrates the interplay of control and data signals for reliably transferring data between sender 130 and receiver 140. Sender 130 may correspond to an entity 101 or 103, control network 102, or even a control network element within control network 102. Similarly, receiver 140 may correspond to an entity 101 or 103, control network 102, or even a control network element within control network 102.

When receiver 140 is ready to receive data, receiver 140 signals (131) to sender 130, such as, but not limited to, by asserting a ready to receive signal (131). When data is ready to be sent, sender 130 provides control events (132) to receiver 140, which then acquires/receives/captures/latches the data (133). Thus, the data is transferred (133) from sender 130 to receiver 140. In one embodiment, data transference 133 is a latching of data by receiver 140 into a register. In one embodiment, data transference 140 includes capturing a stream of data. When the data has been captured/received, receiver 140 notifies sender 130, such as by causing a transition to occur on the receive signal (131). In this manner, data has been reliably transferred from sender 130 to receiver 140.

In one embodiment, a control network element is a computer control structure having one or more input ports and one or more output ports and being made up of binary logic elements. The function of the control network element is to accept a control event on any one of its input ports and to produce a control event on the appropriate one of its output ports. Control events are transitions from a low to a high logic level or, alternatively, from a high to low logic level. An input event can only occur when the input port has signaled its readiness. Likewise an output event can only occur when the neighboring input port has signaled its readiness.

A control network is typically composed of basic logic circuits such as AND, OR, NAND, NOR, XOR, XNOR gates and other such gates and flip-flops well known in the art of digital circuit design. Examples of three control network elements made up of these basic circuits, are Data Stage 200 (shown in FIG. 2A), Data Branch 240 (shown in FIG. 2B), and Data Arbiter 270 (shown in FIG. 2C). In each of these control network elements 200, 240, 270, the gate and flip-flop circuits are partitioned into a control logic part (210, 250, 280), and a data logic part (220, 260, 290). The control logic (210, 250, 280) typically contains only logic gates; while the data logic (220, 260, 290) contains both gates and flip-flops (e.g., for capturing the data).

Figure 2A:
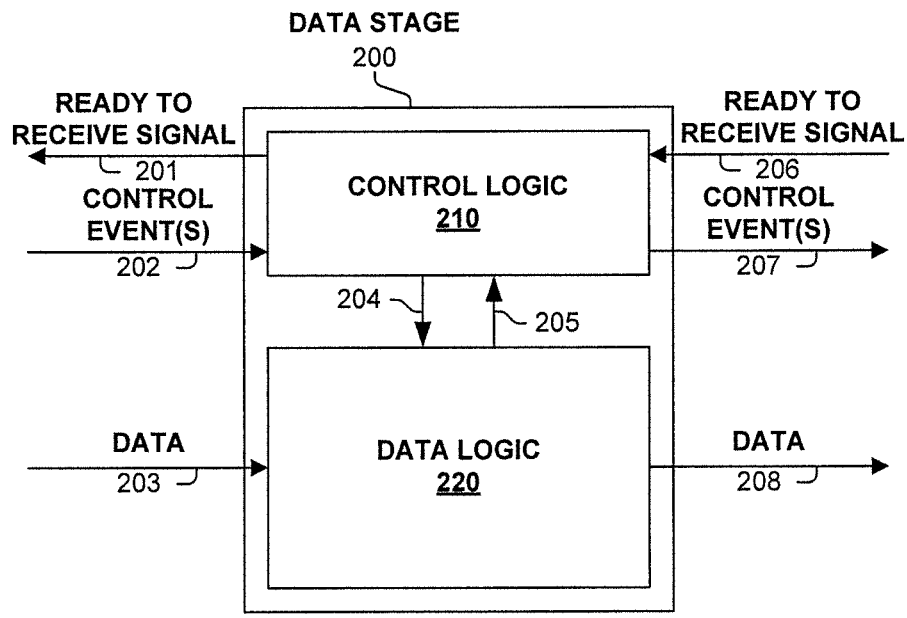
FIG. 2A illustrates a Data Stage control component used in one embodiment.

Referring to FIG. 2A, illustrated is a data stage 200 control network element used in one embodiment. The basic operation of communicating the data to and from data stage 200 was described in relation to FIG. 1B, and data logic 220 is constructed by usual procedures familiar to those experienced in the art of computer system design.

As to the particular operation of data stage 200, when ready to receive data, control logic 210 signals ready to receive (201). In response to receiving one or more externally generated control event(s) (202), control logic 210 signals to data logic 220 to acquire data 203 from the external source (e.g., another control network element, or an entity outside the control network). Again, such operation can be simply latching/capturing data into a register, or even receiving a stream of one or more packets or other data units. Upon completion of the acquisition of the data, data logic 220 provides signal 205 to control logic 210, so it can proceed with passing the acquired data (as data 208) to a next control network element or external entity via a similar process. Having acquired data (208), control logic 210, in response to receiving ready to receive signal (206), control logic 210 will provide one or more control events 207 (e.g., a signaling that data is ready, the size of the available packet and/or the quantity of a stream of data available) to the next control network element or external entity, which will receive data 208. In one embodiment, control logic 210 becomes aware that data 208 has been transferred via signal 205 or signal 206.

Figure 2B:
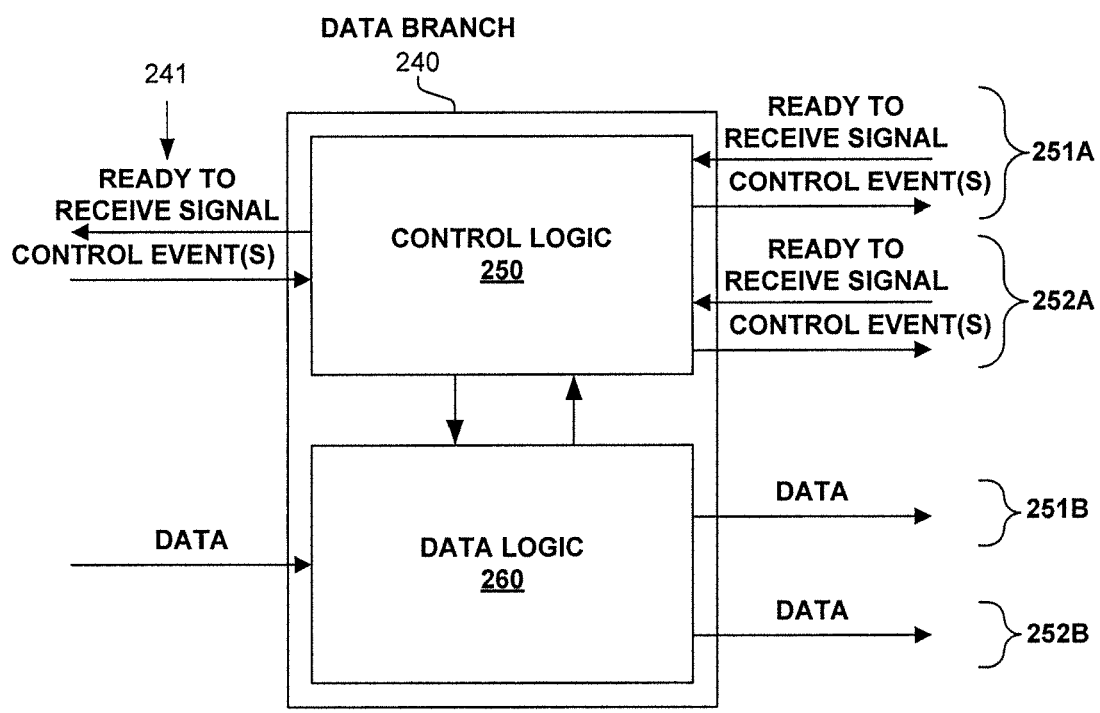
FIG. 2B illustrates a Data Branch control component used in one embodiment.
Figure 2C:
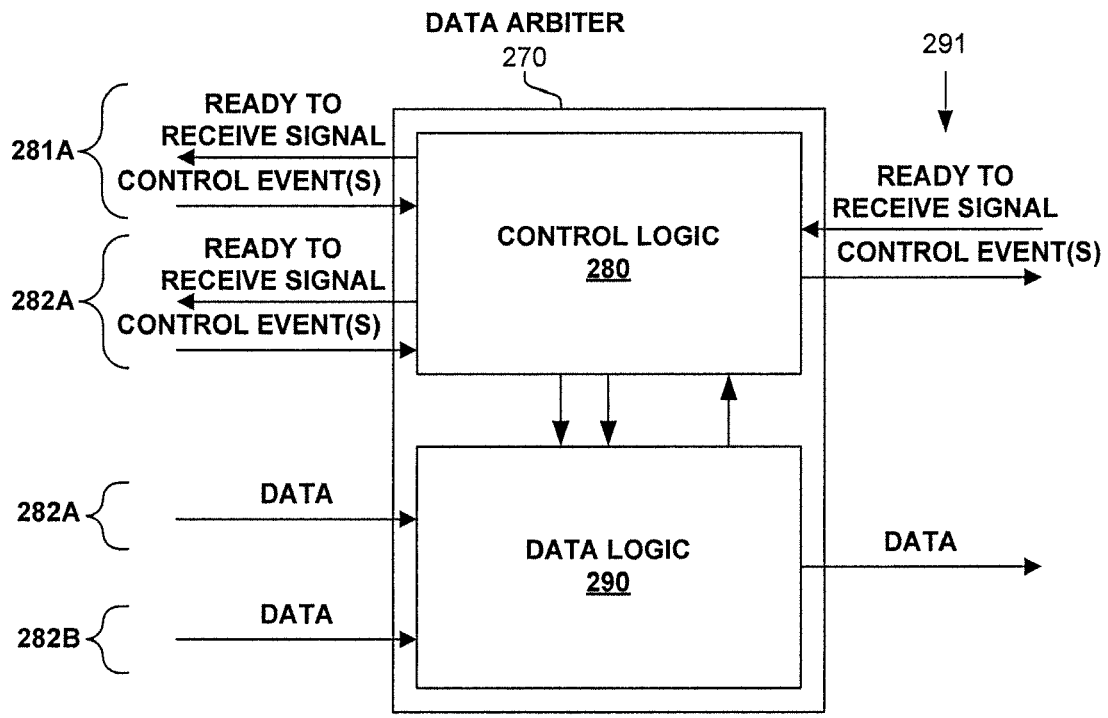
FIG. 2C illustrates a Data Arbiter control component used in one embodiment.

Similar actions take place using data branch control network element (240, FIG. 2B) and data arbiter control network element (270, FIG. 2C). Data branch 240 acquires data using control signals (241) and reliably provides a copy on one or both outputs (251B, 252B) of the received data using signals 251A, 252A. Data arbiter 270 receives two sets of data (281A, 282A) using signals 281A, 282A, and reliably provides this received data in an arbitrary, serial order to a next control network element or external entity via data/signals 291. Conventional means familiar to those experienced in the art of digital system design are used for automatic routing of data carried out in the data logic of the data branch 240 and similarly for arbitration of the concurrent arrival of data carried out in the control logic of the data arbiter 270.

Figure 3:
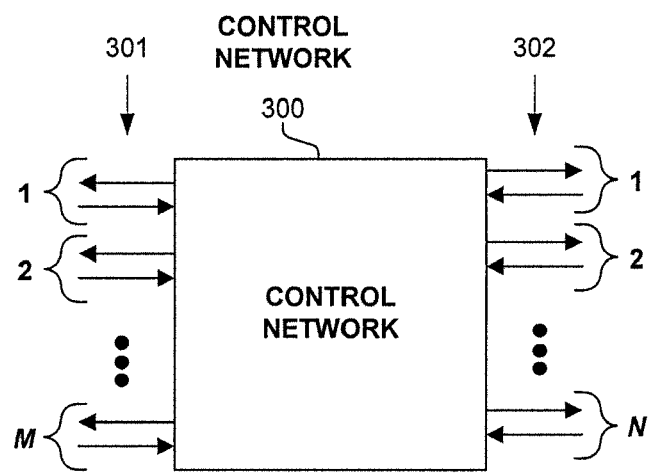
FIG. 3 illustrates a control network used in one embodiment.

A control network 300 of one embodiment is illustrated in FIG. 3, and represents a composition of one or more control network elements (in series, parallel or coupled in another appropriate manner), such as, but not limited to control network elements 200, 240 and 270 of FIGS. 2A-C. As shown, control network 300 has M input ports and N output ports. Each of these ports has two control connections: one on which a control event travels from a first control structure to a second, and one on which the readiness of the second control structure is signaled to the first (e.g., such as that described in relation to FIG. 1B). Note, the corresponding data paths are not shown. In one embodiment, a control event is either a low to high transition or a high to low transition on the connections among internal gates, input ports and output ports. At the input and output ports these transitions should be monotonic and have no portions with vanishing slope. Violation of either of these two conditions constitutes an instability hazard or a metastability hazard, respectively.

Control network 300 must be delay-insensitive, hazard-free and the control structure must satisfy the following four conditions:

1) All input ports of control network 300 must be live. That is, it must always be true that any input port in FIG. 3 will eventually be ready to receive a control event. Thus, for any sequence of control events it must always be possible for a control event to occur eventually on an input port. This corresponds to the expectation that input control events will not be indefinitely ignored.

2) There must be port independence in control network 300. A control event on any input in FIG. 3 must cause a sequence of control events internal to the control network 300 that results in a control event on some output port. Consider a particular input port as an example of any one of a plurality of input ports and a particular output port as an example of any one of a plurality of output ports. At any other input port, a control event may occur independently of that on the particular input port without blocking more than temporarily the sequence of control events internal to the control structure that produce said control event at the particular output port.

3) All output ports of control network 300 must be live. That is, it must always be possible that an output port will eventually emit a control event in response to a control event on some input port. This corresponds to the expectation that all output ports can participate in control activity.

4) All ports of control network 300 must operate safely. An input port must cooperate with its environment so that it does not receive a control event unless it has indicated its readiness to receive such a control event. Likewise, an output port must also cooperate with its environment so that it does not emit a control event unless the succeeding input port has indicated its readiness. This prevents control events from overtaking each other on either the input control connection or the output control connection, a situation which may lead to the annihilation of control events and the ultimate failure or deadlock of the system.

One embodiment uses control network 300 that does not strictly follow these four conditions, as it still is useful in some specialized cases.

Further, in one embodiment, control network 300 is constructed using digital logic gates and flip-flops. However, any computational technology that is delay-insensitive, hazard-free and satisfies the four conditions can be used in one embodiment. Signaling a control event by means of logic level transitions, either upward or downward, is advantageous because of the energy savings achieved, but many other signaling schemes (e.g., transition/2-phase, return-to-zero/4-phase) are possible so long as they are delay-insensitive, hazard-free and satisfy the four conditions described supra.

As previously mentioned, the composition of control network 300 can be formed by any composition of one or more control network elements (e.g., in series, parallel, or in any custom combination), as long as they are coupled in an appropriate manner (e.g., matching control and data signals). However, the number of possible control event sequences grows exponentially rather than linearly with the number of control network elements used in control network 300. In one embodiment, the integrity of the entire control network 300 can be verified (e.g., physically exercising the control network itself and/or its design via modeling, analysis, and/or applying or using other testing or design verification methodologies). However, it is noted that if the integrity of each individual portion of control network 300 (whether being a single or multiple control network elements appropriately coupled) is verified and these individual portions are appropriately coupled, then the integrity of entire control network 300 has been verified. Thus, control network 300 is verified to be insensitive to delay variations (e.g., such as those induced by fabrication process which may vary among differently fabricated chips, for example), and to not have any control sequences leading to a deadlock state.

Figure 4:
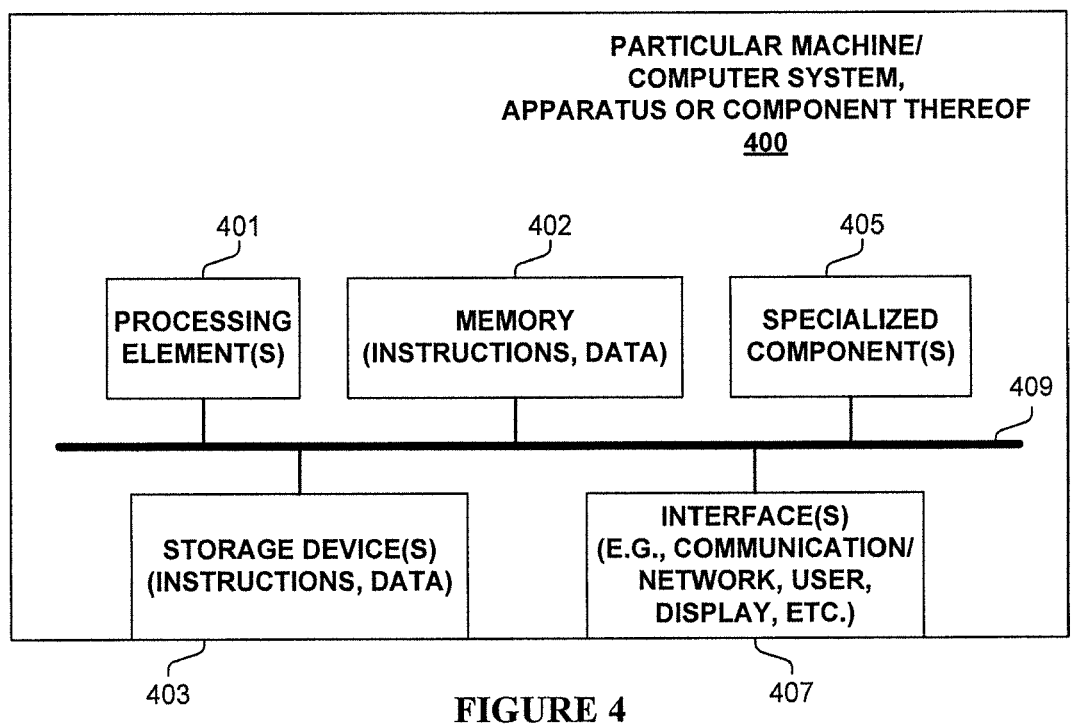
FIG. 4 illustrates an apparatus or component used in one embodiment.

This verification of a control network may include, but is not limited to: physically exercising the control network itself and/or its design via modeling, analysis, and/or applying or using other testing or design verification methodologies. FIG. 4 illustrates one such computer system 400 (or other particular machine, apparatus, or component thereof) used, in one embodiment, to verify the integrity of a control network. In one embodiment, apparatus or component 400 performs one or more processes corresponding to one of the flow diagrams illustrated or otherwise described herein.

In one embodiment, apparatus or component 400 includes one or more processing element(s) 401, memory 402, storage device(s) 403, specialized component(s) 405 (e.g., optimized hardware such as for performing operations, etc.), and interface(s) 407 for communicating information (e.g., sending and receiving packets, user-interfaces, displaying information, etc.), which are typically communicatively coupled via one or more communications mechanisms 409 (e.g., bus, backplane, etc.), with the communications paths typically tailored to meet the needs of the application. In one embodiment apparatus or component 400 corresponds to, or is part of, a service or application node illustrated in one of the other figures or otherwise described herein.

Various embodiments of apparatus or component 400 may include more or less elements. The operation of apparatus or component 400 is typically controlled by processing element(s) 401 using memory 402 and storage device(s) 403 to perform one or more tasks or processes. Memory 402 is one type of computer-readable/computer-storage medium, and typically comprises random access memory (RAM), read only memory (ROM), flash memory, integrated circuits, and/or other memory components. Memory 402 typically stores computer-executable instructions to be executed by processing element(s) 401 and/or data which is manipulated by processing element(s) 401 for implementing functionality in accordance with an embodiment. Storage device(s) 403 are another type of computer-readable medium, and typically comprise solid state storage media, disk drives, diskettes, networked services, tape drives, and other storage devices. Storage device(s) 403 typically store computer-executable instructions to be executed by processing element(s) 401 and/or data which is manipulated by processing element(s) 401 for implementing functionality in accordance with an embodiment.

Figure 5:
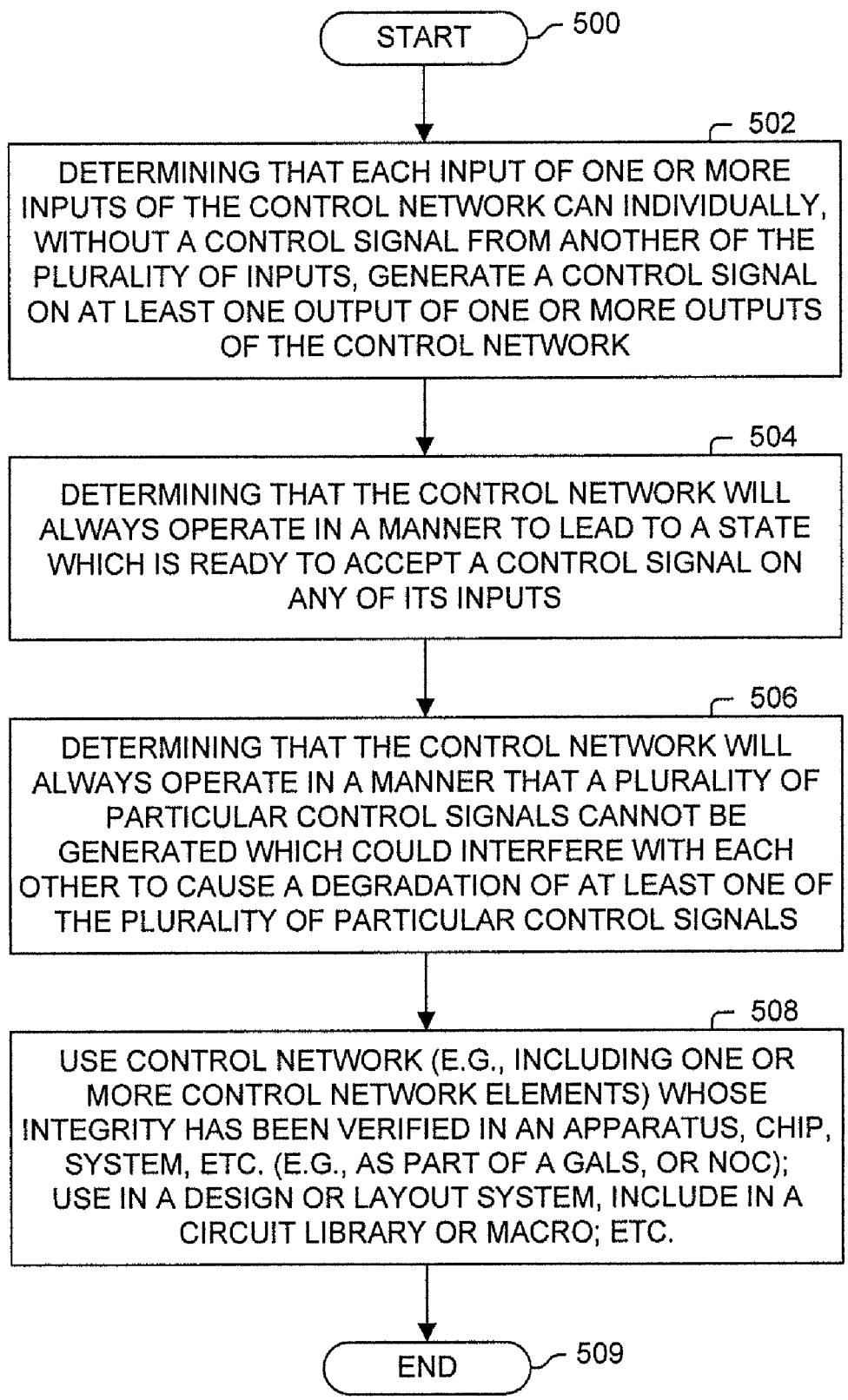
FIG. 5 illustrates a process performed in one embodiment.

Next, FIG. 5 illustrates a process performed in one embodiment including for verifying the integrity of a control network. If one of these verification operations of process blocks 502-508 is not fulfilled, then the control network is not verified. In which case, typically an engineer will modify the design of the control network to overcome its identified deficiency.

Processing begins with process block 500. In process block 502, performed is the operation of determining that each input of one or more inputs of the control network can individually, without a control signal from another of the plurality of inputs, generate a control signal on at least one output of one or more outputs of the control network. In process block 504, performed is the operation of determining that the control network will always operate in a manner to lead to a state which is ready to accept a control signal on any of its inputs. In process block 506, performed is the operation of determining that the control network will always operate in a manner that a plurality of particular control signals cannot be generated which could interfere with each other to cause a degradation of at least one of the plurality of particular control signals. One embodiment has verified the integrity of a control network as long as each of the operations of process blocks 502, 504 and 506 have been performed. If one or more of them have not, then the integrity of the subject control network has not been verified; and typically an engineer will modify the design of the control network to overcome its identified deficiency.

As presented in process block 508, the control network (e.g., including one or control elements) whose integrity has been verified is then to be used in a computer, communications, or other system to provide the appropriate control signals between entities, such as, but not limited to, being part of a globally-asynchronous, locally-synchronous (GALS) system, or an asynchronous network-on-chip (ANoC). Additionally, the control network whose integrity has been verified may be included as part of a circuit/system design/layout tool for use in designing and fabricating custom systems and chips. One embodiment includes one or more descriptions of a control network whose integrity has been verified in a design library or macro for use in designing and building/fabricating systems. One embodiment includes a chip including one or more control networks whose integrity has been verified that can be used as part of a system. Thus, embodiments include not only actual verification methods, apparatus and other forms, but also those methods, apparatus and other fauns that use control networks whose integrity has been verified, whether it be in the design of devices/components/systems, or the actual devices/components/systems themselves. Processing of the flow diagram is complete as indicated by process block 509.

Figure 6:
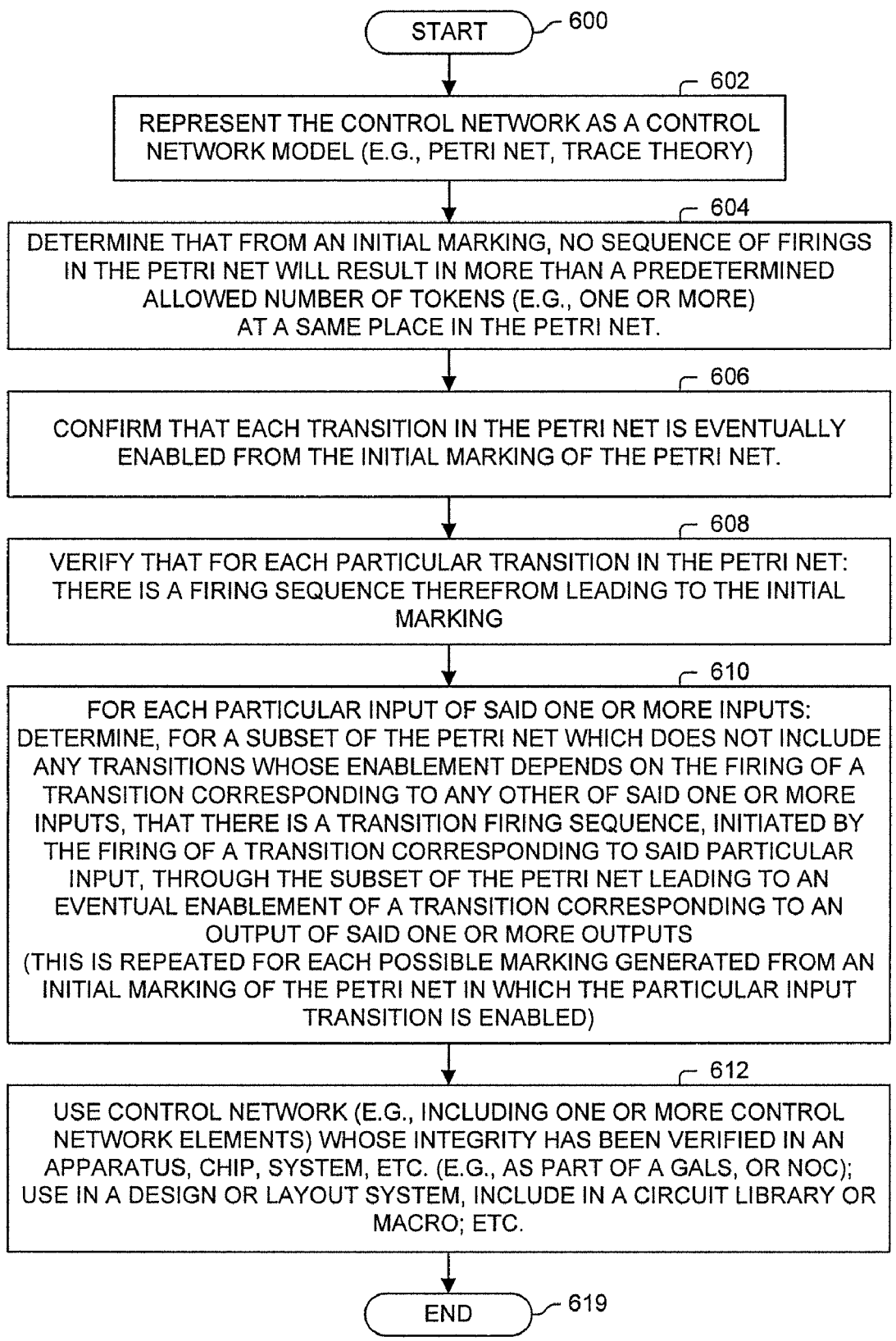
FIG. 6 illustrates a process performed in one embodiment.

FIG. 6 illustrates a process performed in one embodiment including for verifying the integrity of a control network. If one of these verification operations of process blocks 602-610 is not fulfilled, then the control network is not verified. In which case, typically an engineer will modify the design of the control network to overcome its identified deficiency.

Processing begins with process block 600. In process block 602, the control network is represented as a control network model, such as a Petri net, using trace theory or another modeling technology. For purposes of explanation, the control network model will be discussed in terms of a Petri net model, with these teachings extensible to trace theory or other modeling technologies.

Petri nets include places and transitions. Inputs and outputs of the control network are represented as transitions. The Petri net is given an initial marking, corresponding to an initial marking of the control network, such as that corresponding to a state entered in response to a reset signal of the system incorporating the control network. However, the initial marking is a state in which the Petri net will return after being exercised. So, if a one-time initialization is performed, the first marking in response to a reset operation might not be the "initial marking" of the control network.

From the initial marking, a depth-first (alternatively breadth-first or another order) expansion or exercising of the Petri net is performed to generate an entire tree of possible markings (i.e., reachability graph of all of the possible markings) that the Petri net can enter. As the Petri net should have firing paths leading to previous markings, these marking are not duplicated (nor is there an infinite expansion loop). Note, the firing of a single enabled transition in the Petri net from some marking (e.g., the parent marking) generates the child marking.

As one can imagine, the number of markings can be quite large, including exponentially increasing as the number of control elements increase. Thus, one approach is to partition the control network into smaller, subset control networks, and verify the integrity of the individual, smaller subset control networks. As discussed herein, if each smaller subset control network has its integrity verified and is assembled in an appropriate manner (e.g., connecting control connections to control connections, and data path connections and to data path connections), then the integrity of the resulting composition will have also been verified. Thus, the integrity of a control network may be accomplished by verifying the presence of liveness, safety, and port independence of either (1) the entire control network, itself; or (2) each individual subset control network of the control network, with these subset control networks connected appropriately to create a composition of these control networks, with that composition being the entire control network.

In process block 604, the reachability graph is reviewed to ensure that there are no more than a predetermined allowed number of tokens at any place in the Petri net. Note, in one embodiment, this operation is performed as the reachability graph is generated. By ensuring this condition is met, the control network is verified that it will always operate in a manner that a plurality of particular control signals cannot be generated which could interfere with each other to cause a degradation of at least one of the plurality of particular control signals.

In one embodiment, the predetermined number of allowed tokens at all places in the Petri net is one, such as corresponding to the transmission of only a single data unit (e.g., bit, byte, packet, etc.). However, certain systems using the control network may desire to communicate data between two entities more efficiently, such as by using a windowing protocol such as that used by Transmission Control Protocol (TCP) such that multiple data units can be in transit at one time. Thus, one embodiment allows places to have assigned a predetermined number of allowed tokens (of one or greater). For example, if one embodiment allows five data units to be transmitted, and a sixth token arrives at a place assigned a predetermined number of allowed tokens of five, then this condition would be violated. In one embodiment, the predetermined number of allowed tokens is by default one for all places, unless otherwise specified.

From the tree of possible markings, an adjacency matrix of markings is generated, with the rows and columns representing the different markings, with the corresponding matrix value set to indicate a transition from a parent marking to a child marking (even those in which a child marking is a previously generated marking).

In process block 606, the adjacency matrix is reviewed to ensure that each transition in the Petri net is enabled by the firing of some transition.

The adjacency matrix is transitively closed to generate a reachability matrix (e.g., the matrix identifies from each marking which other markings can be reached therefrom).

Transitive closing uses the basic transitive principle. In other words, if marking-1 goes to marking-2, and marking-2 goes to marking-3, then it is known that marking-1 goes to marking-3. In such manner, the adjacency matrix can be transformed, typically via an iterative process until there is not another consolidation identified, into the reachability matrix.

In process block 608, the reachability matrix is reviewed to verify that for each particular transition in the Petri net: there is a firing sequence therefrom leading to the initial marking. In one embodiment, this operation can be performed by verifying that all markings can reach all other markings. (As a marking is reachable from the initial marking, and if there is a firing sequence from each marking back to the initial marking, then there must be some firing sequence from each marking to each other marking.)

Note, the adjacency matrix includes designations of corresponding transitions which correspond to an input port or an output port of the control network. In process block 610, the adjacency matrix is used to verify that there is a firing sequence from each input port to at least one output port, with this firing sequence not being dependent on the firing of a transition corresponding to another input port. One embodiment accomplishes this task by removing any transitions that rely on a different input port than the one currently being analyzed. This modified adjacency matrix is then transitively closed, at least until it is determined that a transition corresponding to one of the output ports is reachable from the transition corresponding to the input port being analyzed. This operation is repeated for each possible marking generated from an initial marking of the Petri net in which the particular input transition is enabled, to ensure that every time the transition corresponding to an input port is fired, it is guaranteed to generate a control signal on one of the output ports (e.g., cause a transition corresponding to one of the output ports to fire.) As a reminder, this verification is performed for each input port of the control network.

As presented in process block 612, the control network (e.g., including one or more control elements) whose integrity has been verified is then to be used in a computer, communications, or other system to provide the appropriate control signals between entities, such as, but not limited to, being part of a globally-asynchronous, locally-synchronous (GALS) system, or an asynchronous network-on-chip (ANoC). Additionally, the control network whose integrity has been verified may be included as part of a circuit/system design/layout tool for use in designing and fabricating custom systems and chips. One embodiment includes one or more descriptions of a control network whose integrity has been verified in a design library or macro for use in designing and building/fabricating systems. One embodiment includes a chip including one or more control networks whose integrity has been verified that can be used as part of a system. Thus, embodiments include not only actual verification methods, apparatus and other forms, but also those methods, apparatus and other forms that use control networks whose integrity has been verified, whether it be in the design of devices/components/systems, or the actual devices/components/systems themselves. Processing of the flow diagram is complete as indicated by process block 619.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for verifying the integrity of a control network, with the method comprising:
    (a) determining that each input of one or more inputs of the control network can individually, without a control signal from another of the plurality of inputs, generate a control signal on at least one output of one or more outputs of the control network;
    (b) determining that the control network will always operate in a manner to lead to a state which is ready to accept a control signal on any of its inputs; and
    (c) determining that the control network will always operate in a manner that a plurality of particular control signals cannot be generated which could interfere with each other to cause a degradation of at least one of the plurality of particular control signals.

2. The method of claim 1, wherein only a single control network element is in the control network.

3. The method of claim 1, comprising: representing the control network as a control network model; wherein each of said operations of (a), (b), and (c) include exercising of the control network model.

4. The method of claim 3, wherein the control network model uses trace theory.

5. The method of claim 3, wherein the control network model includes a Petri net.

6. The method of claim 5, with each of said one or more inputs and said one or more outputs of the control network is represented as a transition.

7. The method of claim 5, wherein the method includes for each particular input of said one or more inputs: determining, for a subset of the Petri net which does not include any transitions whose enablement depends on the firing of a transition corresponding to any other of said one or more inputs, that there is a transition firing sequence, initiated by the firing of a transition corresponding to said particular input, through the subset of the Petri net leading to an eventual enablement of a transition corresponding to an output of said one or more outputs.

8. The method of claim 7, wherein said operation of determining that there is a transition firing sequence is repeated for each possible marking of the Petri net, eventually generated from an initial marking of the Petri net, in which the transition corresponding to said particular input is enabled; wherein the initial marking of the Petri net corresponds to an initial state of the control network.

9. The method of claim 8, wherein the method includes confirming that each transition in the Petri net is eventually enabled from the initial marking of the Petri net.

10. The method of claim 9, wherein the method includes: verifying that for each particular transition in the Petri net: there is a firing sequence therefrom leading to the initial marking.

11. The method of claim 10, wherein the method includes: determining that from an initial marking, no sequence of firings in the Petri net will result in more than a predetermined allowed number of tokens at a same place in the Petri net.

12. The method of claim 11, wherein the predetermined allowed number of tokens at all places is one.

13. The method of claim 11, wherein at least two different places in the Petri net have different said predetermined allowed number of tokens.

14. The method of claim 11, wherein the method includes: determining that from the initial marking, all transitions will be fired by a set of one or more firing sequences in the Petri net.

15. The method of claim 5, wherein the method includes confirming that each transition in the Petri net is eventually enabled from an initial marking of the Petri net; wherein the initial marking of the Petri net corresponds to an initial state of the control network.

16. The method of claim 15, wherein the method includes: verifying that for each particular transition in the Petri net: there is a transition sequence therefrom leading to the initial marking.

17. The method of claim 5, wherein the method includes: verifying that for each particular transition in the Petri net: there is a transition sequence therefrom leading to an initial marking; wherein the initial marking of the Petri net corresponds to an initial state of the control network.

18. The method of claim 5, wherein the method includes: determining that from an initial marking, no sequence of firings in the Petri net will result in two tokens at a same place in the Petri net; wherein the initial marking of the Petri net corresponds to an initial state of the control network.

19. The method of claim 18, wherein the method includes: determining that from the initial marking, all transitions will be fired by a set of one or more sequences of firings in the Petri net.

20. The method of claim 5, wherein the method includes: determining that from an initial marking, all transitions will be fired by a set of one or more sequences of firings in the Petri net; wherein the initial marking of the Petri net corresponds to an initial state of the control network.

21. The method of claim 5, wherein the method includes: determining that from an initial marking, no sequence of firings in the Petri net will result in more than a predetermined allowed number of tokens at a same place in the Petri net.

22. The method of claim 21, wherein at least two different places in the Petri net have different said predetermined allowed number of tokens.

23. The method of claim 21, wherein the method includes: determining that from the initial marking, all transitions will be fired by a set of one or more sequences of firings in the Petri net.

24. An apparatus for verifying the integrity of a control network, with the apparatus comprising:
   (a) means for determining that each input of one or more inputs of a control network can individually, without a control signal from another of the plurality of inputs, generate a control signal on at least one output of one or more outputs of the control network;
   (b) means for determining that the control network will always operate in a manner to lead to a state which is ready to accept a control signal on any of its inputs; and
   (c) means for determining that the control network will always operate in a manner that a plurality of particular control signals cannot be generated which could interfere with each other to cause a degradation of at least one of the plurality of particular control signals.

25. The apparatus of claim 24, wherein each of said (a), (b) and (c) means for determining exercise a Petri net representation of the control network.

26. An apparatus for verifying the integrity of a control network, with the apparatus comprising:
   one or more processing elements; and
   memory;
   wherein said one or more processing elements are configured to perform operations, including:
   (a) determining that each input of one or more inputs of the control network can individually, without a control signal from another of the plurality of inputs, generate a control signal on at least one output of one or more outputs of the control network;
   (b) determining that the control network will always operate in a manner to lead to a state which is ready to accept a control signal on any of its inputs; and
   (c) determining that the control network will always operate in a manner that a plurality of particular control signals cannot be generated which could interfere with each other to cause a degradation of at least one of the plurality of particular control signals.

27. The apparatus of claim 26, wherein said operations include: representing the control network as a control network model; wherein each of said operations of (a), (b), and (c) include exercising of the control network model.

28. An apparatus, comprising:
   one or more processing elements; and
   one or more storage devices;
   wherein said one or more processing elements are configured to implement circuit designing or layout of systems, which includes interfacing two or more subsystems using a control network; and
   wherein the control network has been verified that:
   each input of one or more inputs of the control network can individually, without a control signal from another of the plurality of inputs, generate a control signal on at least one output of one or more outputs of the control network;
   the control network will always operate in a manner to lead to a state which is ready to accept a control signal on any of its inputs; and
   the control network will always operate in a manner that two particular control signals cannot be generated which could interfere with each other to cause a degradation of at least one of the plurality of particular control signals.

29. The apparatus of claim 28, wherein a Petri net model of the control network will include at least one hundred transitions.

30. An apparatus, comprising:
   a plurality of entities; and
   a control network for providing control signals for interfacing between two entities a plurality of circuits in order to provide a reliable interface between the plurality of circuits;
   wherein the control network has been verified that:
   each input of one or more inputs of the control network can individually, without a control signal from another of the plurality of inputs, generate a control signal on at least one output of one or more outputs of the control network;
   the control network will always operate in a manner to lead to a state which is ready to accept a control signal on any of its inputs; and
   the control network will always operate in a manner that two particular control signals cannot be generated which could interfere with each other to cause a degradation of at least one of the plurality of particular control signals.

31. The apparatus of claim 30, wherein a Petri net model of the control network will include at least one hundred transitions.

32. The apparatus of claim 31, wherein each of the plurality of entities is a locally-synchronous object.

* * * * *

UNITED STATES PATENT AND TRADEMARK OFFICE
CERTIFICATE OF CORRECTION

| | | |
|---|---|---|
| PATENT NO. | : 8,218,448 B1 | Page 1 of 1 |
| APPLICATION NO. | : 12/869298 | |
| DATED | : July 10, 2012 | |
| INVENTOR(S) | : Cox et al. | |

It is certified that error appears in the above-identified patent and that said Letters Patent is hereby corrected as shown below:

Col. 11, line 45, replace "fauns" with -- forms --

Signed and Sealed this
Nineteenth Day of February, 2013

Teresa Stanek Rea
*Acting Director of the United States Patent and Trademark Office*